Jan. 24, 1956 K. BESOYAN 2,732,035
TRUCK-TRAILER EMERGENCY BRAKE
Filed Jan. 19, 1953 3 Sheets-Sheet 1

INVENTOR
KIRK BESOYAN
BY
Mason & Graham
ATTORNEYS

Jan. 24, 1956 K. BESOYAN 2,732,035
TRUCK-TRAILER EMERGENCY BRAKE
Filed Jan. 19, 1953 3 Sheets-Sheet 2

INVENTOR
KIRK BESOYAN
BY
Mason & Graham
ATTORNEYS

Jan. 24, 1956    K. BESOYAN    2,732,035
TRUCK-TRAILER EMERGENCY BRAKE
Filed Jan. 19, 1953    3 Sheets-Sheet 3

INVENTOR
KIRK  BESOYAN
BY
*Mason & Graham*
ATTORNEYS

United States Patent Office 2,732,035
Patented Jan. 24, 1956

2,732,035

TRUCK-TRAILER EMERGENCY BRAKE

Kirk Besoyan, Los Angeles, Calif.

Application January 19, 1953, Serial No. 331,961

3 Claims. (Cl. 188—4)

This invention has to do with emergency brake devices for stopping heavy vehicles, such as trucks and trailers, in the event of failure of the regular braking system. This application is a continuation in part of my copending application for patent for Vehicle Emergency Brake, Serial No. 175,066, filed July 21, 1950.

Many serious accidents, with consequent loss of life and extensive property damage, occur in the operation of heavy trailers and trucks due to brake failures which result in the vehicles getting out of control. While several attempts have been made by others to provide emergency braking devices, so far as I know, these have not proved satisfactory. An object of my invention is to provide a novel and improved device in the nature of an emergency braking means which is normally carried by the vehicle in a standby or inoperative position but which can be instantly rendered effective if its use is required as in the event of failure of the regular braking system.

Another object is to provide an emergency braking means embodying a sled-like drag shoe which is lowerable from a standby out-of-the-way position upon supporting structure to operable position and which, when performing its emergency braking function, does not place any strain upon the lowering or supporting structure or upon the vehicle except through the regular vehicle wheels.

Another object is to provide a braking drag shoe which is lowerable into position where a given wheel (or wheels) of the vehicle will ride thereon and thereafter be cradled therein and permitted to rotate and which is so constructed that the cradled wheel is retained and forward thrust of the vehicle is transmitted through the wheel to the shoe without danger of the wheel overrunning the shoe.

A further object is to provide braking means of the type heretofore indicated which is so constructed that it can be made of relatively lightweight metal, such as aluminum or aluminum alloys, whereby the additional weight which the braking means adds to a commercial trucking vehicle is inconsequential.

These and other objects will be apparent from the drawings and the following description.

Referring to the drawings.

Figure 1:
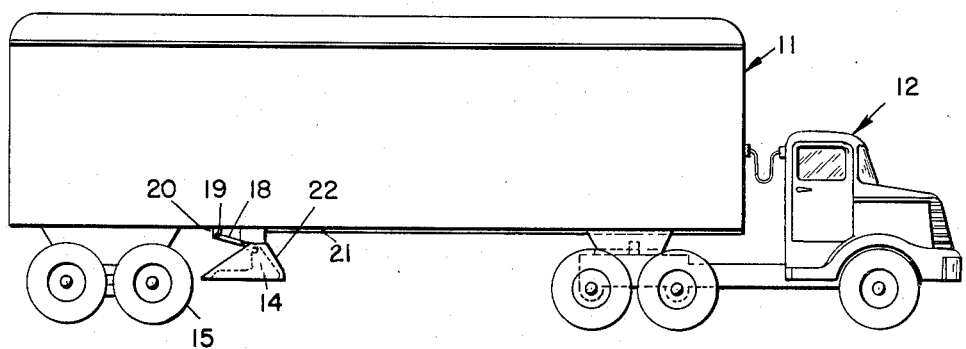
Fig. 1 is an elevational view of a truck-tractor and trailer showing the invention applied thereto with the braking means in inoperative or standby position.

More particularly describing the invention, 11 generally indicates the trailer or semi-trailer unit of a truck-trailer vehicle having a tractor unit 12. The invention generally comprises a pair of sled-like drag shoes, indicated by 14, which are carried beneath the body of the trailer or other vehicle in a position forwardly of the wheels 15. In Fig. 1 the shoes 14 are shown in inoperative or standby position, and in Fig. 2, in the position they occupy when they are brought into service. The particular trailer shown has dual wheels 15 as shown in Fig. 3.

Figure 7:
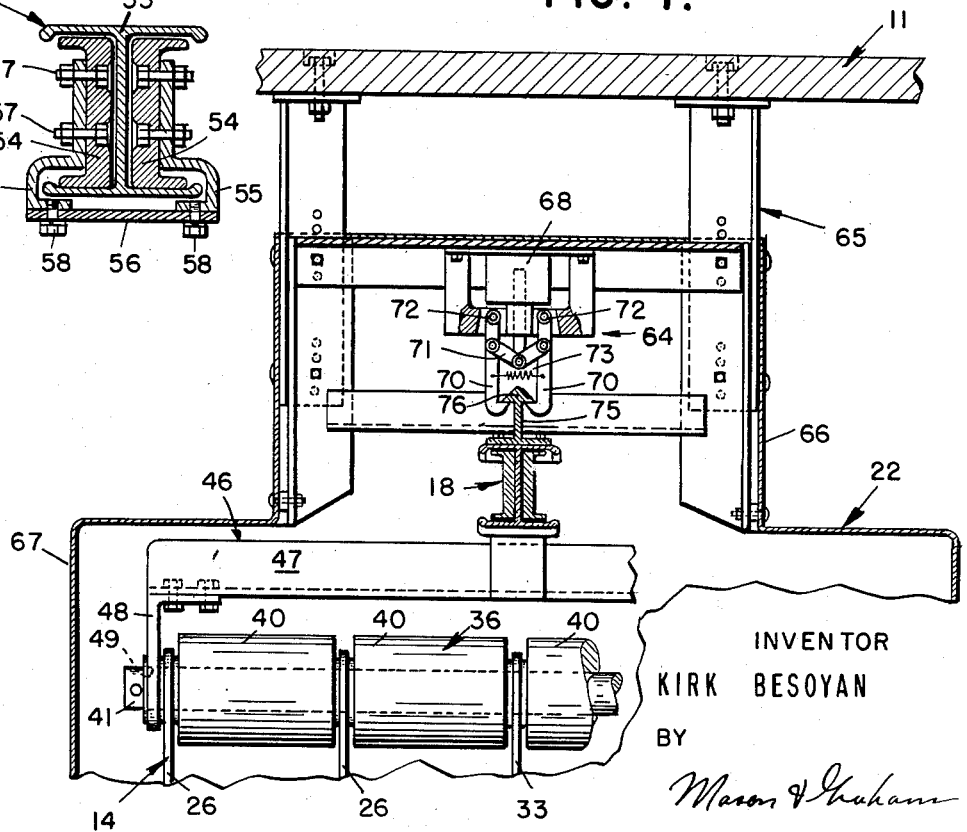
Fig. 7 is a fragmentary sectional view on line 7—7 of Fig. 5 on an enlarged scale.
Figure 8:
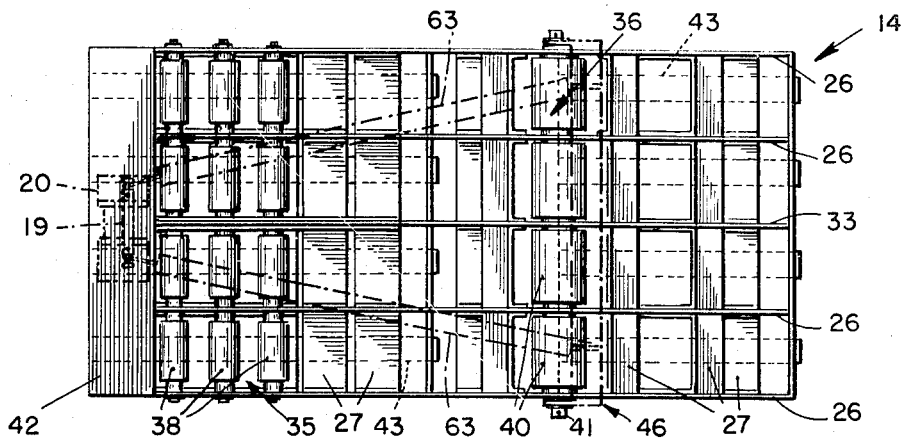
Fig. 8 is a plan view of one of the brake shoes with the yoke portion and equalizing springs in broken lines.
Figure 9:
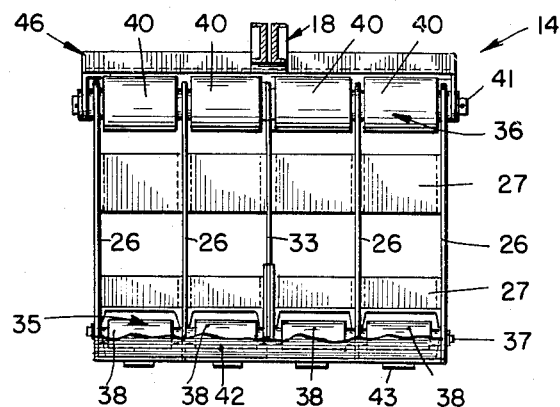
Fig. 9 is a front elevational view of the brake shoe shown in Fig. 8.

Each braking or drag shoe is attached to a boom assembly 18 pivotally secured at 19 to bracket 20 mounted beneath the bed 21 of the trailer. Also, when in inoperative position, the shoe is partially enclosed within a housing 22 and releasably retained therein by means of a latch mechanism 64 (Fig. 7) to be described later.

Referring now to the details of construction, each shoe is sled-like in character being comprised of a plurality of laterally spaced, vertical plates 26 which extend longitudinally of the shoe and are joined by a plurality of transversely extending, channel-shaped individual cross members 27 which can be secured by conventional means. Each plate 26 is somewhat triangular in shape at the forward portion thereof having a rounded nose portion 29. An elongated substantially rectangular trailing portion 31 extends rearwardly of the forward portion. The particular form of shoe illustrated is designed for dual wheels and is provided with a center plate 33 which is somewhat higher than the other plates rearwardly of the forward portion thereof to form a divisional wall 33' which may be capped with a nosing 34.

The rear portion of the shoe is provided with a set of wheel-supporting rollers, indicated by 35. Near the top of the shoe there is provided what will be termed a wheel-abutment roller means 36. This should be positioned at a height above the rollers 35 at least as great as a distance equal to about one-third the diameter of the wheel with which the shoe is to be used. Thus when the shoe is dropped to operative position and the wheels 15 ride up upon it to the position shown in Fig. 2 the upper roller means 36 is sufficiently high to obviate any possibility of the wheels riding over the shoe and in consequence the wheels may rotate in the shoe, being cradled therein between the various sets of rollers, and at the same time act to push the shoe forward.

Figure 10:
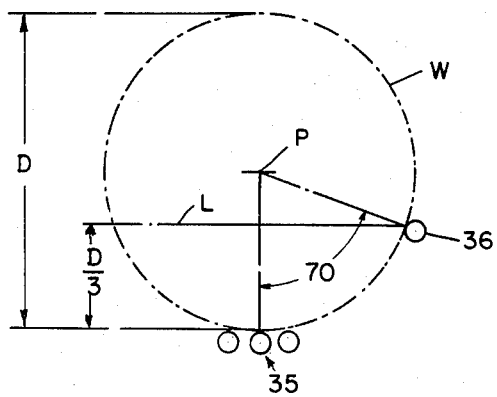
Fig. 10 is a diagrammatic view illustrating the relative positions of the wheel-cradling rollers.

In Fig. 10 I show diagrammatically the relative positions of the roller means 35 and 36 with roller means 36 positioned at the minimum height above rollers 35 of one-third the diameter of the wheel with which the shoe is to be used. By reference to this figure it will appear that the set of rollers 35 and roller means 36 are equidistant from a common point P located vertically above the lower rollers 35 and that they are spaced circularly at least about 70°. The point P corresponds to the axis of a wheel W with which the shoe would be used and line L passing through roller 36 is at an elevation equal to one-third the diameter D of the wheel. Roller means 36 may be located higher than shown but I prefer not to have it higher than one-half the diameter of the wheel.

The rollers 35 and 36 may be of various materials and constructed in any suitable manner; however, I show in the case of each roller 35 a shaft 37 on which a plurality of roller elements 38 are rotatably mounted intermediate the plates 26. In a similar manner the upper roller 36 may consist of a plurality of individual roller elements 40 rotatable on a shaft 41.

An inclined ramp wall 42 is provided at the rear of the shoe so that when the shoe is dropped in front of the wheels, the latter will readily ride up into position.

It should be noted that the shoe extends forwardly of the wheel abutment roller means 36 for a substantial distance to prevent its tilting forward under the wheels in use. I have found that where the height of the roller means 36 above rollers 35 is equal to about one-third the diameter of the wheel with which the shoe is used, the shoe should extend forwardly of the wheel abutment roller means 36 by substantially the same distance. If the wheel abutment roller means is positioned higher, the forward extent of the shoe should be increased about proportionately.

In order to provide the desired ground-engaging surface beneath the sled I utilize a plurality of laterally spaced runners 43 which are detachably secured by screws 44 to the cross members 27 at the bottom of the shoe and these members 43 curve upwardly at 43' in the front. Two sets of runners are shown. Runners of different width or different material may be used to obtain different degrees of frictional engagement of the shoe with the ground surface thereby providing the means of adjusting a standard shoe to individual vehicles.

Figure 6:
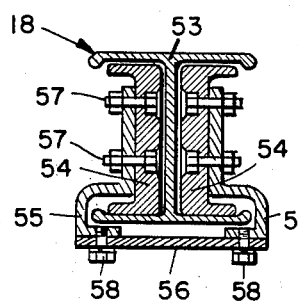
Fig. 6 is an enlarged sectional view on line 6—6 of Fig. 5.

Each shoe is fitted with a yoke, generally indicated by 46, which may comprise a channel member 47 provided with rearwardly offset end brackets 48 having openings 49 to receive the ends of the shaft 41. One element of the boom assembly 18 is rigidly attached to the yoke in the center thereof. The shoe is so balanced that if suspended by the yoke it tends to hang inclined with the rear end lowermost. The boom itself comprises telescoping members which include an I beam member 53 which is pivotally mounted at 19 and a pair of plates 54 which fit slidably within the confines of the sides of the I beam. Two or more connecting assemblies each comprising the side brackets 55, plate 56, and suitable bolts 57 and 58 secure the members 54 together as best shown in Fig. 6.

I beam 53 may be provided with a stop 61 to limit extension of the boom; however, the boom should be sufficiently long that it is not fully extended when the shoe is lowered and beneath the wheels, and thus there will be no strain imposed upon the boom. I provide means for yieldably urging the parts of the boom to fully telescoped or retracted position and this comprises a pair of tension springs 63 connected at one end to the bracket 20 and at their other ends to the yoke 46.

As previously indicated, when the shoes are in inoperative position they are releasably retained within the housing 22. This housing is mounted beneath the bed of the vehicle in any suitable manner as by means of frame means 65. The housing includes an upper portion 66 and a forward portion 67.

Within the housing is mounted latch means 64 for releasably retaining the shoe in the housing. This comprises a solenoid 68 connected to latch arms 70 by toggle linkage 71. Latch arms 70 are pivotally mounted at 72 and normally urged toward each other by a spring 73. Energization of the solenoid moves the arms 70 apart to effect release. The boom of the shoe is provided with an upwardly extending plate 75 which has a laterally enlarged upper edge portion 76 normally held by the latch arms 70.

In the housing I provide an anti-rattle spring 80 mounted on a channel 81 and adapted to bear against the boom just above the yoke when the shoe is housed.

Figure 2:
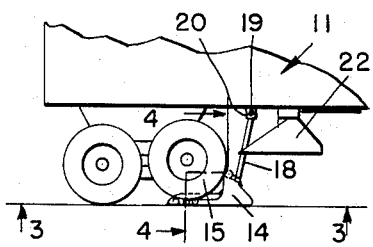
Fig. 2 is a fragmentary side elevational view of the lower rear portion of the trailer of Fig. 1 showing the braking means in operative position.
Figure 4:
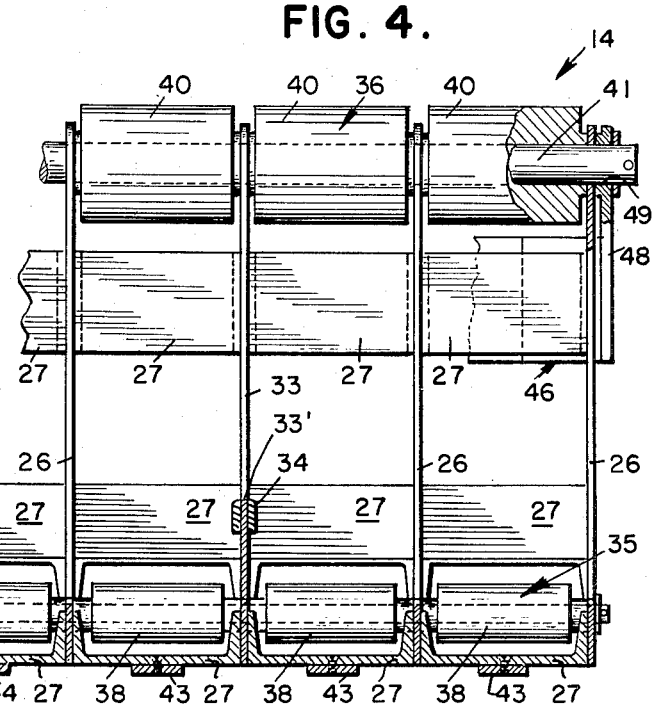
Fig. 4 is a fragmentary sectional view through a braking shoe taken substantially along the plane indicated by line 4—4 of Fig. 2.
Figure 3:
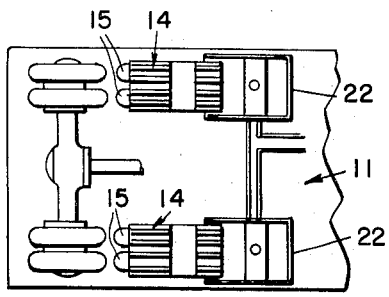
Fig. 3 is an inverted plan view on line 3—3 of Fig. 2.
Figure 5:
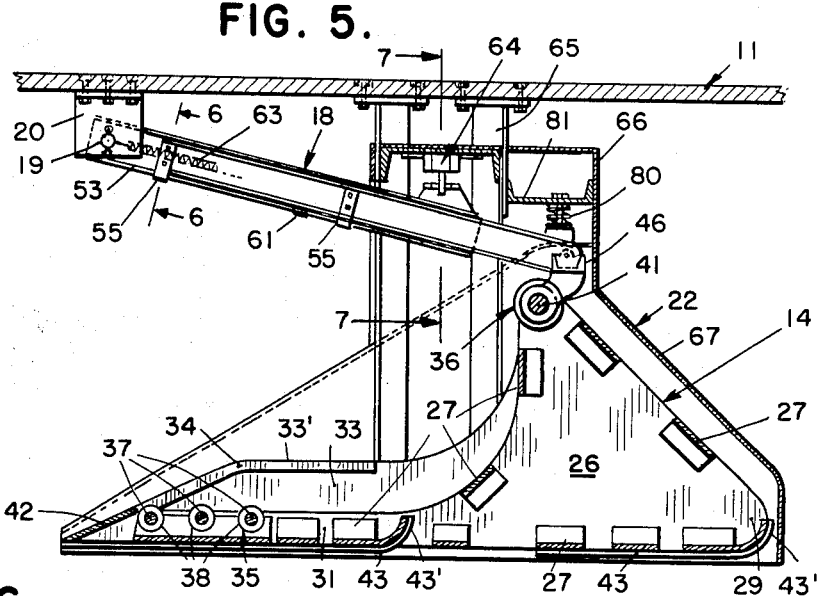
Fig. 5 is a longitudinal vertical sectional view through a braking shoe and the housing and mounting means therefor.

In the operation of the emergency braking means, solenoids 68 may be energized in any conventional way to cause release of the pair of drag shoes from their housed, inoperative position of Figs. 1 and 5 to braking position of Figs. 2 and 3. As the shoes are released they fall by gravity and guided by booms 18 to a position in front of wheels 15 which run up ramp 42 onto the rollers 35 and abut the roller means 36. The shoes are then forced forward by the forward thrust of the vehicle creating a drag through the wheels. The booms are sufficiently extensible that no strain is placed upon them to be transmitted to the vehicle therethrough. After the vehicle has been brought to a stop it can be backed off the shoes at which time the springs 63 assist a person in returning the individual shoes to their original position, serving to retract the booms and partially elevate the forward part of the shoes.

Another function of springs 63 is to insure proper positioning of the shoes relative to the truck wheels until such time as the shoes are firmly engaged between the wheels and the road surface. I have found that, when the shoes are used on a rough or bumpy road, there is a tendency for the truck wheels to bounce somewhat when they first engage the shoes. During any such bouncing, the springs serve to elevate the front ends of the shoes as the wheels rise and maintain the shoes ahead of the wheels, insuring proper reengagement of the wheels with the shoes when the wheels descend. Thus the springs 63 serve to cause the shoes to, in a sense, "follow" the wheels should the wheels bounce after first engaging the shoes until the wheels settle down and firmly engage the shoes and hold them against the road surface and in sliding contact therewith.

Figure 11:
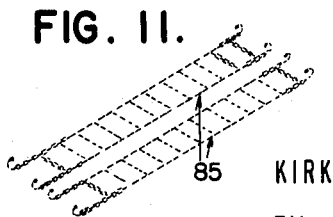
Fig. 11 is a perspective view of a pair of chains.

For use on icy roads, the shoes may be equipped with special chains 85, such as those shown in Fig. 11.

Although I have illustrated and described a preferred form of my invention, I contemplate that various changes and modifications can be made without departing from the invention, the scope of which is indicated by the following claims.

I claim:

1. In a vehicle having a body portion supported from the ground surface by a wheel, an emergency brake comprising a shoe characterized by its ability to gradually absorb forward momentum of said vehicle by smooth, frictional, non-tilting engagement with said ground surface, said shoe having an elongated smooth bottom ground-engaging surface and longitudinal and upwardly disposed wall surfaces defining a wheel-receiving cradle above said ground-engaging surface, and roller means carried by said shoe and spaced above said ground-engaging surface in position for engagement by the periphery of a wheel in said cradle; said longitudinal surface extending forwardly from a point behind the axis of rotation of said wheel to a point forwardly of said axis below the front peripheral surface portion of said wheel, said upwardly disposed surface extending upwardly from said longitudinal surface a distance at least one-third the diameter of said wheel, and said ground-engaging surface extending forwardly from a point beneath the rear end portion of said longitudinal surface to a point spaced forwardly of the top end portion of said upwardly disposed surface a distance equal at least to one-third the diameter of said wheel.

2. The device of claim 1 wherein said ground-engaging surface of said shoe is comprised of smooth-bottomed ribs spaced apart transversely of the bottom portion of said shoe and disposed longitudinally thereof.

3. The device of claim 1 which additionally includes means suspending said shoe from the body portion of said vehicle, said means comprising a pair of telescopically associated links and spring means resiliently urging said links into telescoped relationship, one of said links being pivotally secured at its top end to said body portion immediately ahead of said wheel and the other of said links being pivotally secured at its bottom end to said shoe adjacent the top end of said uprightly disposed wall surface.

(References on following page)

References Cited in the file of this patent

UNITED STATES PATENTS

| | | |
|---|---|---|
| 960,426 | Stawartz | June 7, 1910 |
| 1,087,553 | Riener | Feb. 17, 1914 |
| 1,138,561 | Helfer | May 4, 1915 |
| 1,384,589 | Blaney | July 12, 1921 |
| 1,482,538 | Arnold | Feb. 5, 1924 |
| 1,567,454 | Murray | Dec. 29, 1925 |
| 1,604,909 | Griffin | Oct. 26, 1926 |

FOREIGN PATENTS

| | | |
|---|---|---|
| 238,311 | Great Britain | Aug. 20, 1925 |
| 280,984 | Great Britain | Dec. 1, 1927 |
| 318,398 | Great Britain | Sept. 5, 1929 |
| 646,052 | Germany | June 7, 1937 |
| 979,707 | France | Dec. 13, 1950 |